US011039567B2

(12) United States Patent
Larson, Sr.

(10) Patent No.: US 11,039,567 B2
(45) Date of Patent: Jun. 22, 2021

(54) NUT PLANTER TOOL AND METHODS OF USE

(71) Applicant: Lowell Alan Larson, Sr., Marquette, MI (US)

(72) Inventor: Lowell Alan Larson, Sr., Marquette, MI (US)

( * ) Notice: Subject to any disclaimer, the term of this patent is extended or adjusted under 35 U.S.C. 154(b) by 30 days.

(21) Appl. No.: 16/405,686

(22) Filed: May 7, 2019

(65) Prior Publication Data

US 2020/0060069 A1 Feb. 27, 2020

Related U.S. Application Data

(60) Provisional application No. 62/722,304, filed on Aug. 24, 2018.

(51) Int. Cl.
*A01C 7/00* (2006.01)
*A01C 5/02* (2006.01)
*A01C 7/02* (2006.01)

(52) U.S. Cl.
CPC ............... *A01C 7/002* (2013.01); *A01C 5/02* (2013.01); *A01C 7/02* (2013.01)

(58) Field of Classification Search
CPC .... A01B 1/20; A01C 5/02; A01C 7/02; A01C 7/002
See application file for complete search history.

(56) References Cited

U.S. PATENT DOCUMENTS

| 17,089 | A | * | 4/1857 | Green | A01C 5/02 111/96 |
| 1,238,756 | A | * | 9/1917 | Fritts | A01C 7/02 111/92 |
| 3,273,930 | A | * | 9/1966 | Gottfried | A01C 5/02 111/101 |
| 4,218,981 | A | * | 8/1980 | Kelly | A01C 5/02 111/89 |
| 4,585,072 | A | * | 4/1986 | Martinez | A01B 1/165 111/106 |
| 4,736,694 | A | * | 4/1988 | Kratky | A01C 11/00 111/106 |
| 4,932,339 | A | * | 6/1990 | List | A01C 5/02 111/106 |
| 4,974,682 | A | * | 12/1990 | Hoffman | A01B 1/165 172/22 |

(Continued)

FOREIGN PATENT DOCUMENTS

| FR | 1013583 | * | 7/1952 |
| GB | 444635 | * | 3/1936 |

*Primary Examiner* — Thomas B Will
*Assistant Examiner* — Ian A Normile
(74) *Attorney, Agent, or Firm* — Device Patent LLC

(57) ABSTRACT

Disclosed herein is a nut planter tool comprising an elongate drop tube fixed to a dig tube. The dig tube is spaced from the drop tube with each having generally parallel central axes. A plunger assembly comprises a plunger at an inferior end that translates within the dig tube. The tool ergonomically removes a soil core that is larger than the diameter of the tree nut, delivers the nut from an ergonomic height to a proper depth for germination; and replaces the soil core, covering the tree nut. The device is utilized standing upright thus eliminating the physical labor of bending over and reducing typical nut planting time.

1 Claim, 4 Drawing Sheets

(56) References Cited

U.S. PATENT DOCUMENTS

| | | | | |
|---|---|---|---|---|
| 5,398,624 A * | 3/1995 | Caron | ................... | A01B 1/165 |
| | | | | 111/106 |
| 5,924,369 A * | 7/1999 | Hatcher | .................. | A01C 5/02 |
| | | | | 111/106 |
| 6,279,496 B1 * | 8/2001 | Mitchell | .................. | A01C 5/02 |
| | | | | 111/92 |
| 6,662,879 B1 * | 12/2003 | Costa | ....................... | A01C 5/02 |
| | | | | 172/22 |
| 10,897,843 B1 * | 1/2021 | Scryba | .................... | A01C 5/02 |
| 2005/0045349 A1 * | 3/2005 | Cirella | .................... | A01C 5/02 |
| | | | | 172/371 |
| 2006/0180061 A1 * | 8/2006 | Van Denham | .......... | A01C 5/02 |
| | | | | 111/100 |
| 2009/0120655 A1 * | 5/2009 | Hansen | ................ | E01C 23/092 |
| | | | | 172/19 |
| 2010/0060022 A1 * | 3/2010 | Alcov | ...................... | A01C 5/02 |
| | | | | 294/50.7 |
| 2012/0267127 A1 * | 10/2012 | Arigoni | ................... | A01C 5/02 |
| | | | | 172/1 |
| 2015/0327432 A1 * | 11/2015 | Kim | ........................ | A01B 1/20 |
| | | | | 111/7.1 |

* cited by examiner

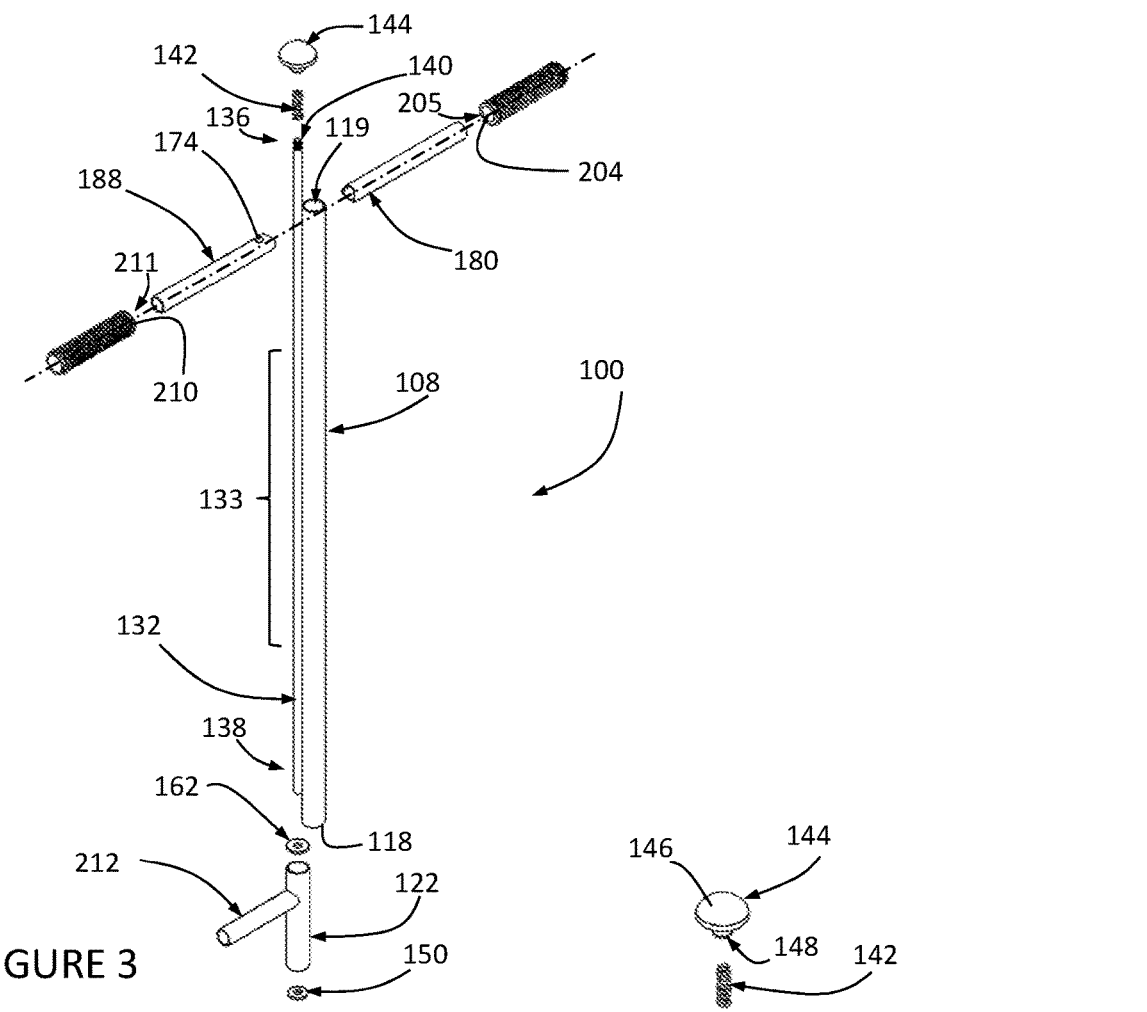
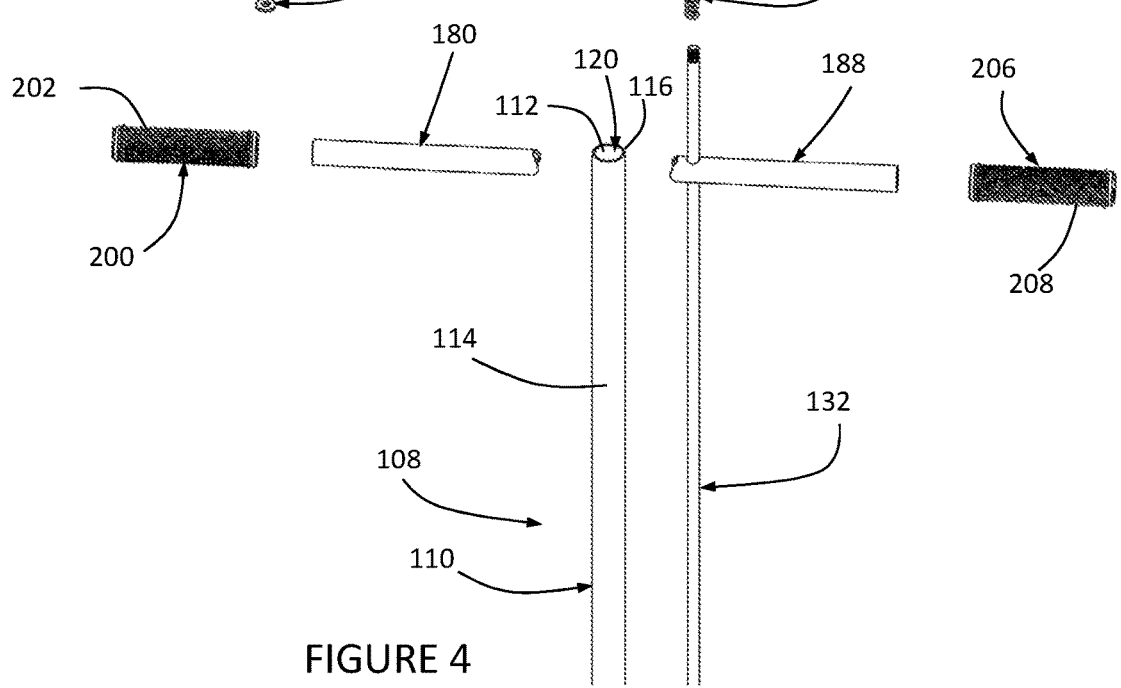

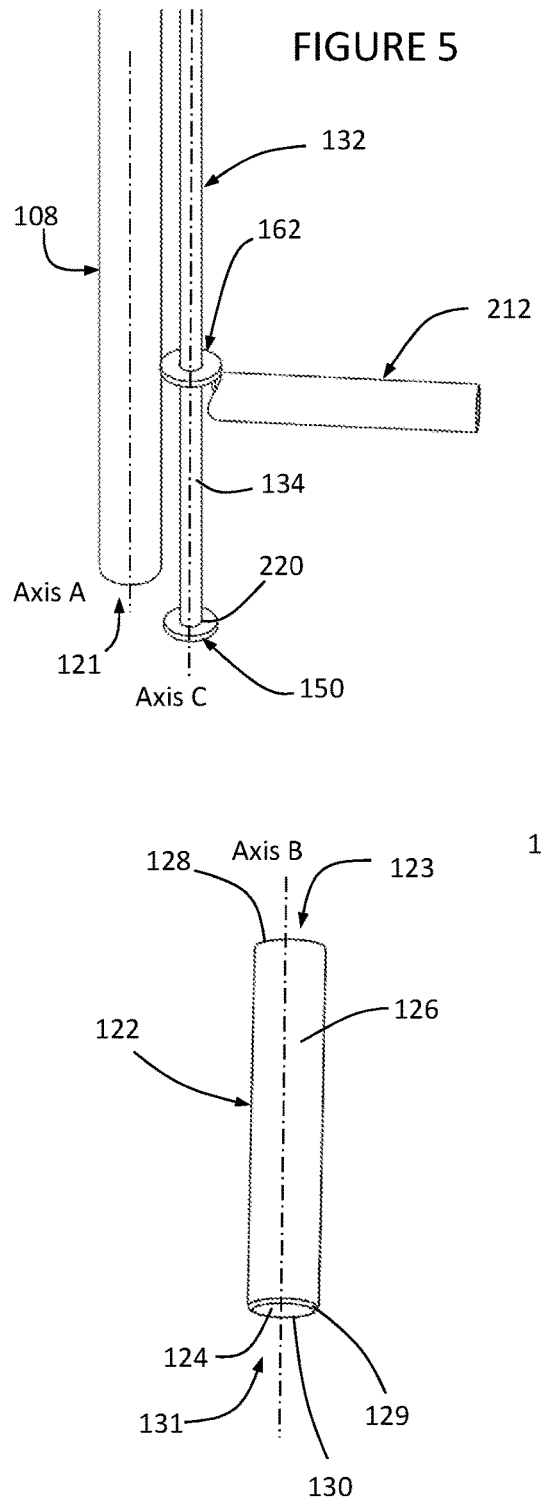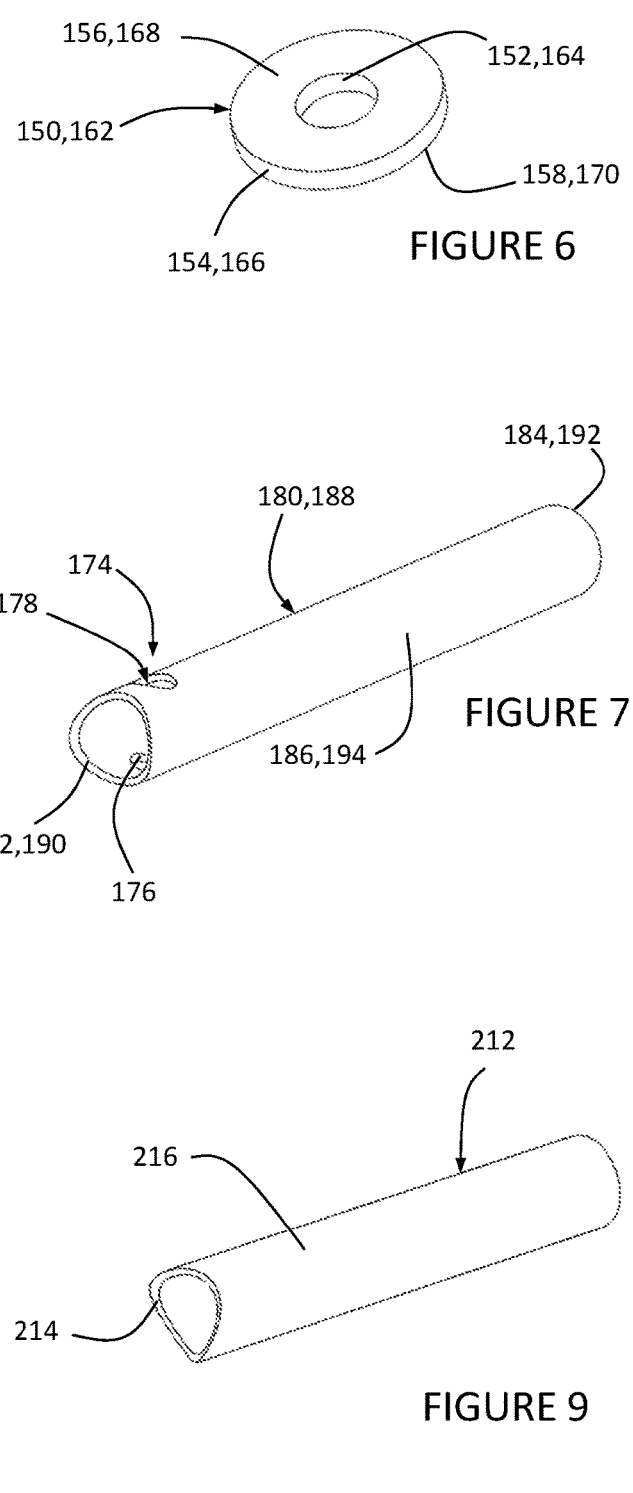

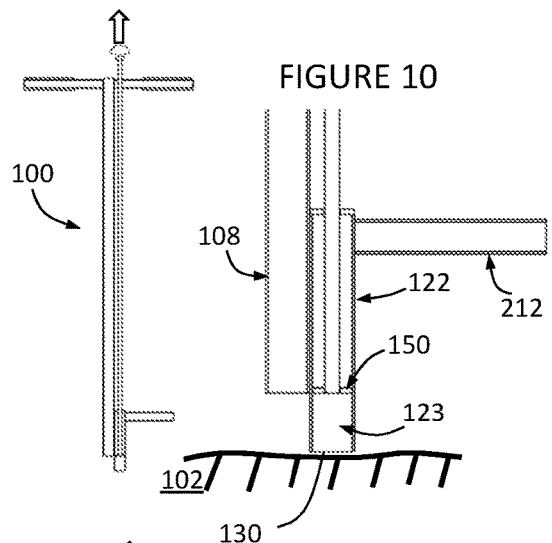
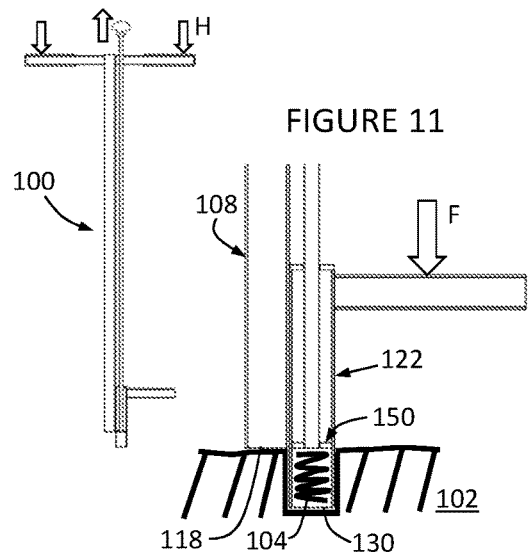
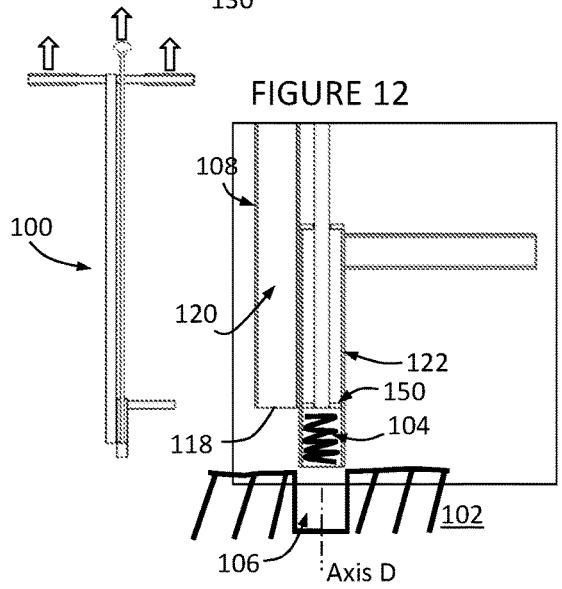
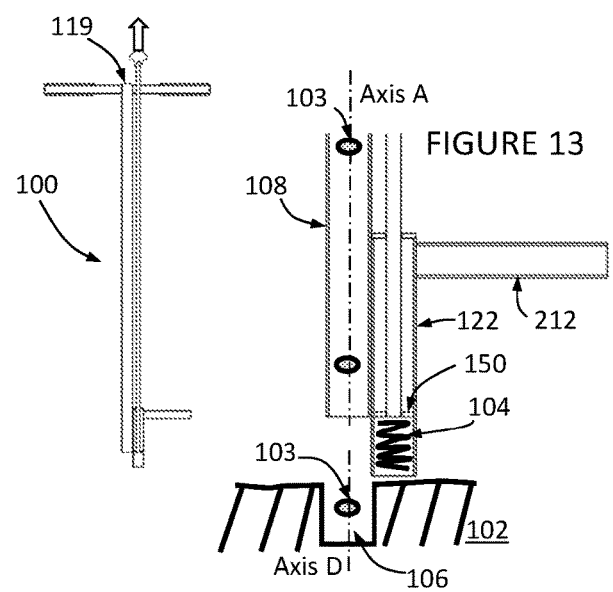
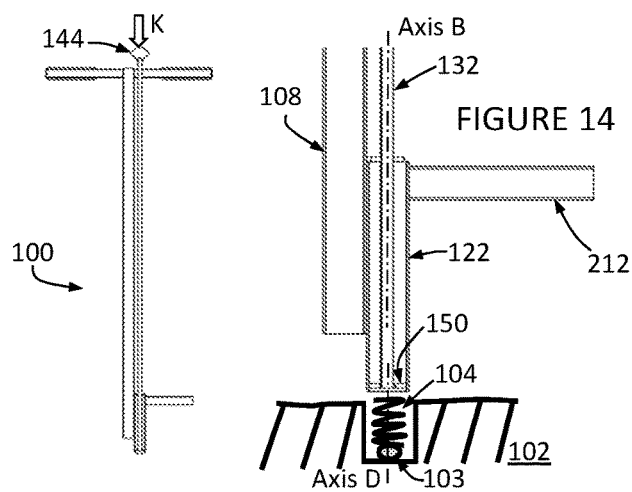

NUT PLANTER TOOL AND METHODS OF USE

CROSS REFERENCE TO RELATED APPLICATIONS

This application claims priority to Provisional Patent Application No. 62/722,304 filed Aug. 24, 2018, the entire disclosure of which is hereby incorporated by reference and relied upon.

BACKGROUND OF THE INVENTION

Field of the Invention. The invention relates generally to tools for planting seeds, and more particularly to ergonomic tree nut planter tools and their methods of use.

Description of Related Art. The prior art lacks manually operated mechanical devices that are ergonomically designed and proficient at planting tree nuts to a proper depth in a variety of forestry applications. What is needed are simple, low cost, and ergonomically beneficial tree nut planter tools having controllable planting depth to facilitate higher germination rates.

BRIEF SUMMARY OF THE INVENTION

The article of invention is a nut planting tool for manual use by a user to mechanically plant a variety of forms of nuts or seed in the areas of forestry, timber production, recreation, and conservation. These nuts or seeds are referred generically herein as nuts or tree nuts. The article of invention consequently benefits users by planting nuts in soil with increased speed and less cost compared to when seedlings are used. In addition, use of the invention results in less physical labor and improved body mechanics. The planted nut will grow into mature plants or trees benefitting the environment by: oxygen production, carbon dioxide removal, cooler environment, providing animal habitats and food sources, and providing a source of lumber production.

In one form, the nut planter ergonomically removes a soil core larger than the diameter of a tree nut simultaneously creating a soil core hole in a ground surface.

In one form, the tree nut planter operates from an ergonomic height of a standing user to create a soil core of a predetermined depth for enhanced germination then replaces the soil core covering the tree nut after its implantation in the soil core hole.

In one form, the tree nut planter delivers a tree nut into a soil core hole from an entry port of a drop tube.

In one form, the drop tube comprises a central Axis A.

In one form, central Axis A is linear.

In one form, a tree nut planter comprises an elongate drop tube having a drop tube wall with an inner face defining a drop cannula extending between an upper port and a lower port.

In one form, the drop tube has one of: a circular, square, rectangular, and other polygonal cross sectional profile.

In one form, the drop tube comprises an outer face on an outside surface of the drop tube.

In one form, the drop tube comprises a superior facing upper face at the upper port.

In one form, the drop tube comprises an inferior facing lower face at the lower port.

In one form, a tree nut planter comprises an elongate dig tube.

In one form, the elongate dig tube comprises a central Axis B.

In one form, central Axis B is linear.

In one form, the dig tube has one of: a circular, square, rectangular, and other polygonal cross sectional profile.

In one form, the elongate dig tube comprises an interior face defining an interior dig cannula extending from a dig port at an inferior end.

In one form, the elongate dig tube comprises an exterior face.

In one form, the dig tube comprises a top face at a superior end.

In one form, the dig tube comprises a bottom face at an inferior end.

In one form, the inferior end of the dig tube is tapered operable to provide eased entry into a ground surface.

In one form, the bottom face at an inferior end of the dig tube is in the form of a sharpened edge.

In one form, drop tube Axis A and dig tube Axis B are parallel.

In one form, the dig tube is fixed to the drop tube.

In one form, the bottom face of the dig tube is spaced inferior of the lower face of the drop tube.

In one form, the tree nut planter comprises one or more handle controls (i.e. first handle control, second handle control, etc.) fixed at a superior end of the drop tube.

In one form, one or more of the first handle control and second handle control diverge from the drop tube.

In one form, one or more of the first handle control and second handle control extend generally perpendicular from the drop tube.

In one form, the one or more of the first handle control and second handle control are in the form of at least one of: a bar, a tube, a plate, and a wheel.

In one form, a first handle control comprises a first external face, a first medial control face, and a first lateral control face.

In one form, the first medial control face is contoured for fit against the outer face of the drop tube.

In one form, a second handle control comprises a second external face, a second medial control face, and a second lateral control face.

In one form, the second medial control face is contoured for fit against the outer face of the drop tube.

In one form, a first handle grip comprises a first grip face on the exterior of a first handle grip.

In one form, a first grip surface defines a first grip cavity operable in size and shape for disposal over the first handle control.

In one form, a second handle grip comprises a second grip face on the exterior of a second handle grip.

In one form, a second grip surface defines a first grip cavity operable in size and shape for disposal over the second handle control.

In one form, a tree nut planter comprises a plunger assembly comprising: a plunger rod, a plunger spring, a plunger knob, a plunger, and at least one of an upper guide and a lower guide.

In one form, the plunger rod is in the form of a linear elongate rod having a central Axis C.

In one form, the plunger rod comprises an outer surface extending from a high end to a low end.

In one form, the high end of the plunger rod is threaded.

In one form, the plunger assembly comprises a plunger spring operable to reside over the plunger rod.

In one form, the plunger spring abuts the plunger knob.

In one form, the plunger assembly comprises a plunger knob having an enlarged plunger face sized for grasping with a user's hand.

In one form, the plunger knob comprises a threaded cavity extending into the plunger knob operable to threaded engagement with threads on the high end of the plunger rod.

In one form, the plunger assembly comprises a plunger fixed to the low end of the plunger rod and operable to drive soil from the dig tube.

In one form, the plunger has an outer profile complementing the inner profile of the dig tube.

In one form, fixation of various components of a tree nut planter tool utilizes one or more of: welds, brackets, fasteners, and clamps.

In one form, a foot arm diverges from an exterior face of the dig tube.

In one form, the foot arm extends generally perpendicular from an exterior face of the dig tube.

In one form, a tree nut planter is in a retracted state when the plunger is retracted within the dig cannula of the dig tube.

In one form, a tree nut planter is in an active state when the plunger is positioned at an inferior end of the dig tube.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments disclosed herein:

FIG. 3 is an exploded perspective view of the nut planter of FIG. 1;

FIG. 4 is an exploded partial perspective view of the nut planter of FIG. 1;

FIG. 5 is a partial perspective view of an inferior portion of the nut planter of FIG. 1 with dig tube removed;

FIG. 6 is a perspective view of a plunger and of a lower guide;

FIG. 7 is a perspective view of a handlebar of the nut planter of FIG. 1;

FIG. 8 is a perspective view of a dig tube of the nut planter of FIG. 1;

FIG. 9 is a perspective view of a foot arm of the nut planter of FIG. 1;

FIG. 10 is a cross-sectional view and adjacent close up cross-sectional view of the tree nut planter of FIG. 1 in preparation for impaling the ground;

FIG. 11 is a cross-sectional view and adjacent close up cross-sectional view of the tree nut planter of FIG. 1 impaled in the ground;

FIG. 12 is a cross-sectional view and adjacent close up cross-sectional view of the tree nut planter of FIG. 1 with soil plug retracted into the dig tube and lifted from ground;

FIG. 13 is a cross-sectional view and adjacent close up cross-sectional view of the tree nut planter of FIG. 1 with drop tube aligned with removed soil plug hole;

FIG. 14 is a cross-sectional view and adjacent close up cross-sectional view of the tree nut planter of FIG. 1 with dig tube realigned with soil plug hole and soil plug refilling the soil plug hole.

DETAILED DESCRIPTION OF SELECTED EMBODIMENTS OF THE INVENTION

Figure 1:
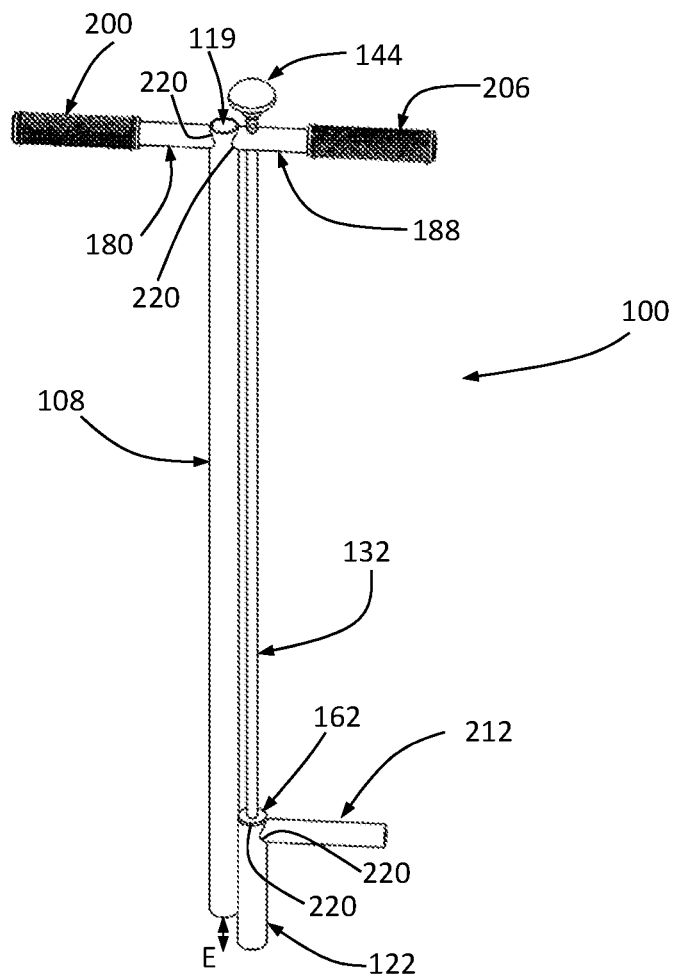
FIG. 1 depicts a rear perspective view of a preferred embodiment of a tree nut planter.

Select embodiments of the invention will now be described with reference to the Figures. Like numerals indicate like or corresponding elements throughout the several views and wherein various embodiments are separated by letters (i.e. 100A, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

FIGS. 1-4, 5 and 13 illustrate a preferred embodiment of a tree nut planter in accordance with an article of invention described herein. The tree nut planter 100 delivers a tree nut 103 into a soil core hole 106 from an upper port 119 of a drop tube 108. The drop tube 108 comprises a central Axis A which is preferably linear however may be non-linear in alternative embodiments. The drop tube 108 comprises a drop tube wall 110 with an inner face 112 defining a drop cannula 120 extending between an upper port 119 and a lower port 121. The drop tube cannula may vary in diameter to accommodate passage various diameter nuts. An outer face 114 covers the outside surface of the drop tube with a superior facing upper face 116 at the upper port 119. An inferior facing lower face 118 is situated at the lower port 121. During use, a user deposits a tree nut at upper port 119 where it is guided down drop cannula 120 along Axis A (FIG. 5) and exits out of lower port 121. In preferred embodiments, drop tube 108 extends substantially a distance between the ground 102 and approximately waist height of a user thereby preventing the need of a user to bend over to implant a seed in the ground. As an example, drop tube length is 37 to 47 inches long. In another example, the drop tube length is approximately 42 inches long.

Figure 2:
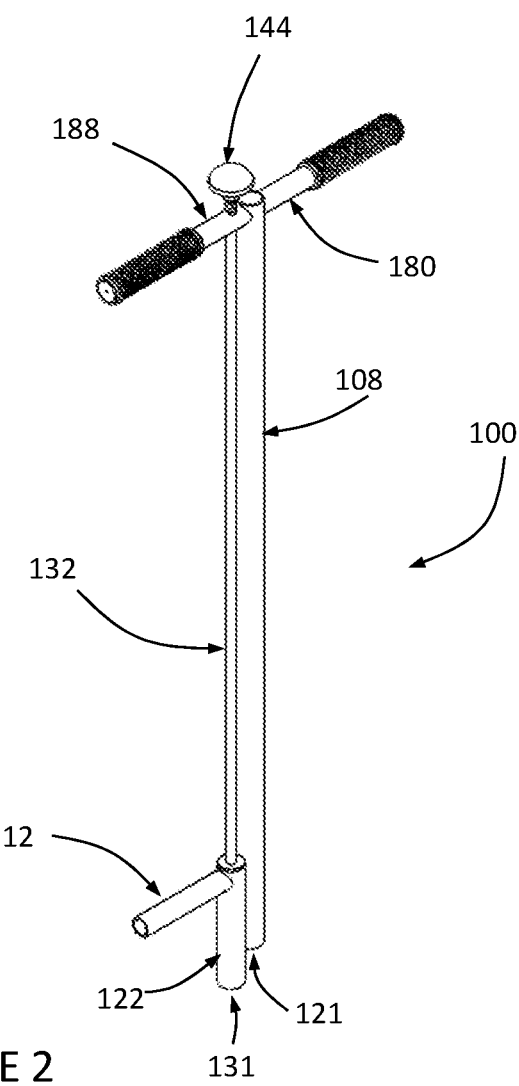
FIG. 2 is depicts a front perspective view of the nut planter of FIG. 1.

The tree nut planter of FIG. 1-2 also illustrates an elongate dig tube 122 having a central Axis B which in preferred embodiments is linear but may alternatively be non-linear. In preferred embodiments, dig tube 122 is between 3 to 7 inches long. In some embodiments, dig tube 122 is approximately 5 inches long. Dig tube 122 comprises an interior face 124 (FIG. 8) defining an interior dig cannula 123 extending from a dig port 131 at an inferior end. An exterior face 126 envelops the exterior and a top face 128 is positioned at a superior end and a bottom face 130 is positioned at an inferior end. In this embodiment, drop tube Axis A and dig tube Axis B are positioned parallel and dig tube 122 is adjacent and fixed to drop tube 108. Bottom face 130 of dig tube 122 is spaced inferior of lower face 118 of drop tube 108 by a distance E (FIG. 1). Distance E represents a depth to which a predetermined nut will be implanted into the ground. In some embodiments, the fixation between the drop tube and the dig tube is adjustable whereas the ideal implantation depth for a given nut can be realized by this adjustment. In some embodiments, distance E varies between 0.75 and 2.25 inches. In some embodiments, distance E is 1.5 inches.

As further illustrated for the embodiment in FIGS. 1-4 and 7, tree nut planter 100 comprises one or more handle controls (i.e. first handle control 180, second handle control 188, etc.) fixed at a superior end of drop tube. Fixation may include one or more of: welds, fasteners, clamps, brackets, threading, and other fixation methods known in the art. As illustrated, first handle control 180 and second handle control 188 extend generally perpendicular from drop tube 108 but may be positioned at other divergent angles. Here, each handle control is aligned on an axis on opposed sides of drop tube 108. In alternative embodiments, the handle controls may be absent. In this case, the user maintains control over the tree nut planter by grasping the outer face 114 of the superior end of drop tube 108. The outer face may be covered with a control grip such as may be made of rubber and wherein an upper guide also extends from the drop tube. However, returning to the embodiments of FIGS. 1-4 and 7, first handle control 180 comprises a first external face 186, a first medial bar face 182 which may be contoured for fit against the outer face of the drop tube, and a first lateral bar face 184. Second handle control 188 comprises a second external face 194, a second medial bar face 190 which may be contoured for fit against the outer face of the drop tube, and a second lateral bar face 192. As illustrated here, the handle controls may be covered by handle grips which may for example comprise a rubber, polymer, cork or similar material. First handle grip 200 comprises a first grip face 202 operable for gipping by a user's hands on the exterior. A first grip surface 204 defines a first grip cavity 205 operable in size and shape for disposal over the first handle control whereas a second handle grip 206 comprises a second grip face 208 on the exterior of second handle grip 206 whereas a second grip surface 210 defines a second grip cavity 211 operable in size and shape for disposal over second handle control 188.

As illustrated in FIGS. 1-3, 5, and 9, foot arm 212 is in the form of an elongate tube having a medial heel face 214 which may be contoured for fixation by weld 220 to an exterior face 126 of dig tube 122. In preferred embodiments, foot arm 212 extends generally perpendicular from dig tube 122 at a position superior of bottom face 130. Foot arm 212 extends a length operable for engagement by a user's foot for driving bottom face 130 of the dig tube into ground soil.

Illustrated in FIGS. 1-5, tree nut planter 100 comprises a plunger assembly 133 comprising: a plunger rod 132, a plunger spring 142, a plunger knob 144, a plunger 150, and at least one of an upper guide 174 and a lower guide 162. In this embodiment, plunger rod 132 is in the form of a linear elongate rod having a central Axis C and comprises an outer surface 134 extending from a high end 136 (which may be a threaded end 140) to a low end 138. Plunger spring 142 is disposed over plunger rod 132 and abuts plunger knob 144 and second exterior face 194 thereby biasing plunger 150 into retraction whereby the tree nut planter tool is in a retracted state (FIGS. 10-13). Plunger knob 144 preferably has an enlarged plunger face 146 sized for grasping with a user's hand and comprises a threaded cavity 148 extending into the plunger knob 144 operable to threaded engagement with threaded end 140 on the high end of plunger rod 132. The plunger assembly illustrated here comprises a plunger 150 which here is in the form of a washer fixed to the plunger rod 132 by welding 220 and operable to drive soil from dig tube 122. In this embodiment, upper guide 174 which is defined by upper guide face 176, is in the form of an upper guide aperture 178 extending through second handle control 188. Upper guide aperture 178 is positioned on a medial end of second handle control 188 and here is generally aligned with a center axis of lower guide 162 whereby plunger rod 132 can move freely up and down through each guide and while plunger 150 translates within dig port 131 to expel soil cores contained therein during use. Lower guide 162 is fixed, preferably by weld, to top face 128 of dig tube 122. When plunger 150 is inferiorly positioned in dig tube 122, the nut planting tool is in an active state.

The fixation of various components of a tree nut planter tool utilizes one or more of: welds, adhesives, brackets, fasteners, and clamps. Components of the tree nut planter may be manufactured from any variety of metals and polymers including but not limited to steels, stainless steels, aluminum, and various alloys and polymers.

In a preferred embodiment, a method of implanting a nut using a tree nut planting tool comprises the following steps as illustrated in FIGS. 10-14. A user grasps first handle control 180 and second handle control 188 (or first handle grip 200 and second handle grip 206 if so equipped) with drop tube 108 generally vertical and bottom face 130 of dig tube 122 resting against the ground 102 soil as illustrated in FIG. 10. The tree nut planter tool 100 is driven downward using downward force H by one or more of: hand force on first handle grip 200 and second handle grip 206 (if equipped), and foot force 'F' on foot surface 216 of foot arm 212 until lower face 118 of drop tube 108 abuts the ground surface. Through this action, bottom face 130 with taper 129 breaches the soil effectuating a soil core 104 to enter dig port 131 and be captured within an inferior portion of dig cannula 123 as illustrated in FIG. 11. During this step, the soil core 104 packs against low face 158 of plunger 150.

As illustrated in FIG. 12, the user then lifts the handle grips upward (i.e. first handle grip 200, second handle grip 206) of tree nut planter 100 causing soil core 104 captured within dig cannula 123 to be removed from the ground and thereby creating soil core hole 106 having Axis D in the ground 102. The user then translates tree nut planter 100 aligning Axis A of drop tube 108 with Axis D of the newly created soil core hole 106. The user then places and releases a nut in upper port 119. Drop cannula 120 of drop tube 108 guides the nut to fall and rest at the bottom of soil core hole 106 as illustrated in FIG. 13.

The user then realigns Axis B of dig tube 122 with Axis D of soil core hole 106. Applying a downward translating force K on plunger knob 144 against plunger spring 142, the force causes consequent translation of plunger rod 132 forcing low face 158 of plunger 150 to approach bottom face 130 of the dig tube (active state). Soil core 104 is consequently released back into soil core hole 106 as illustrated in FIG. 14. The user then releases force K on plunger knob 144 causing consequent superior retraction of plunger 150 into dig cannula 123 due to the force of plunger spring 142 expanding between plunger knob 144 and second exterior face 194 of second handle control 188 (retracted state). The user then moves the tree nut planter 100 to a new tree nut planting location and repeating the above steps to plant the next nut.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:
1. A method of implanting a nut using a tree nut planter tool comprising the steps of:
  obtaining a tree nut planter tool comprising an elongate drop tube having a central axis and having an upper port and a lower port and whereas the drop tube is fixed to a laterally spaced dig tube also having a central axis whereby the central axis of the drop tube and dig tube are parallel and wherein the lower port of the drop tube is spaced superior to a bottom face of the dig tube and whereby one or more control handles extend laterally from a superior end of the drop tube;
  grasping the tree nut planter tool and orientating such that the drop tube is vertical and resting the bottom face of the dig tube against the ground;

driving the tree nut planter downward into the ground whereby the bottom face of the dig tube breaches the ground with a consequent soil core entering and captured within a dig port of a dig cannula at the inferior end of the dig tube and until a lower face of the drop tube contacts the ground;

lifting the tree nut planter upward with consequent removal of a soil core captured within the dig cannula from the ground whereby a soil core hole is created in the ground;

moving the tree nut planter tool such that the central axis of the drop tube and central axis of the soil core hole are aligned;

resting a nut at the bottom of the soil core hole by placing and releasing a nut in the upper port;

moving the tree nut planter tool to realign the central axis of the dig tube with the central axis of the soil core hole; and translating a plunger located in the dig cannula to approach the bottom face of the dig tube thereby releasing the soil core back into the soil core hole.

\* \* \* \* \*